United States Patent
Choi et al.

(10) Patent No.: US 8,732,759 B2
(45) Date of Patent: May 20, 2014

(54) METHOD OF BROWSING RECORDED NEWS PROGRAM AND BROWSING APPARATUS FOR PERFORMING THE METHOD

(75) Inventors: Yoon-hee Choi, Suwon-si (KR); Dong-joon Hyun, Suwon-si (KR); Hee-seon Park, Seoul (KR); Yong-sung Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 466 days.

(21) Appl. No.: 12/336,967

(22) Filed: Dec. 17, 2008

(65) Prior Publication Data
US 2009/0276809 A1 Nov. 5, 2009

(30) Foreign Application Priority Data
Apr. 30, 2008 (KR) .................. 10-2008-0040823

(51) Int. Cl.
*H04N 5/445* (2011.01)
(52) U.S. Cl.
USPC .................. 725/46; 725/41; 725/61
(58) Field of Classification Search
USPC .................. 725/41, 46, 61; 348/700
See application file for complete search history.

(56) References Cited

U.S. PATENT DOCUMENTS

| 6,609,097 | B2 * | 8/2003 | Costello et al. ............... 704/500 |
| 2005/0089224 | A1 * | 4/2005 | Aoki ............................. 382/173 |
| 2007/0016931 | A1 | 1/2007 | Ichioka et al. |
| 2009/0100470 | A1 * | 4/2009 | Yai et al. ......................... 725/46 |

FOREIGN PATENT DOCUMENTS

| KR | 2002-0075081 A | 10/2002 |
| KR | 2003-0056782 A | 7/2003 |
| KR | 1020070005502 A | 1/2007 |

OTHER PUBLICATIONS

Xinbo Gao et al, Unsupervized Vidoe-Shot Segmentation and Model-free anchorperson Detection for News Video Story Parsing, vol. 12, No. 9, Sep. 2002, pp. 765-776.
Communication dated Feb. 24, 2014 issued by the Korean Intellectual Property Office in counterpart Korean Patent Application No. 10-2008-0040823.

* cited by examiner

*Primary Examiner* — Kieu Oanh T Bui
(74) *Attorney, Agent, or Firm* — Sughrue Mion, PLLC

(57) ABSTRACT

Provided are a method of browsing a recorded news program and a browsing apparatus for performing the method. The method includes grouping moving picture news reports included in a plurality of news programs according to news report, and selecting one moving picture news report from among each of a plurality of groups according to preference information input by a user, thereby reproducing only a user desired part from contents of a moving picture news report. Thus, the method can be used to rapidly and efficiently browse the plurality of news programs.

19 Claims, 9 Drawing Sheets

METHOD OF BROWSING RECORDED NEWS PROGRAM AND BROWSING APPARATUS FOR PERFORMING THE METHOD

CROSS-REFERENCE TO RELATED PATENT APPLICATION

This application claims the benefit of Korean Patent Application No. 10-2008-0040823, filed on Apr. 30, 2008, in the Korean Intellectual Property Office, the disclosure of which is incorporated herein in its entirety by reference.

BACKGROUND OF THE INVENTION

1. Field of the Invention

Methods and apparatuses consistent with the present invention relate to digital broadcasting, and more particularly, to a method of browsing a recorded news program and a browsing apparatus for performing the method.

2. Description of the Related Art

Recently, electronic devices such as digital televisions (TVs) or personal video recorders (PVRs) having large storage capacities have been introduced so that users can easily record a broadcasting program via a digital broadcasting channel and can conveniently reproduce and watch the broadcasting program at a desired time.

However, in the case of news programs, a plurality of news reports are generally included in one news program, and the kinds and number of news programs daily broadcast via a digital broadcasting channel are quite numerous. Moreover, some news reports broadcast by different news programs (in the case where a broadcasting station or a broadcast time is different) often include substantially the same contents, therefore, a user has to scan overlapping moving picture news reports one by one so as to browse news during a specific period (e.g., a day), and is inconvenienced since the user has to manually skip other parts by using a fast forward function so as to search for a part in one moving picture news report, in which the user is interested.

FIG. 1 is a diagram of a structure of a news program moving picture.

As illustrated in FIG. 1, the general news program moving picture is formed of a summary, a commercial break, a moving picture article, traffic information, weather information, and the like.

The moving picture news report includes an anchor shot in which a news anchorperson briefly reports a news report, and an episode shot in which a reporter fully explains contents of the news report.

Thus, a user has to directly skip the summary, the commercial break, and the like by using a fast forward function so as to search for a desired news report. Also, in the case where the user desires to watch the episode shot only, the user has to precisely skip only the anchor shot.

Since a plurality of moving picture news reports are generally included in one news program, the user has to skip other news reports so as to watch a desired news report. Furthermore, the higher the number of news programs to be browsed, the higher the number of overlapping news reports, and thus inconveniences increase and a time taken to perform browsing also increases.

SUMMARY OF THE INVENTION

Exemplary embodiments of the present invention provide a method and a browsing apparatus for effectively and rapidly browsing a plurality of recorded news programs.

According to an aspect of the present invention, there is provided a method of browsing a plurality of news programs, the method including the operations of grouping moving picture news reports comprised in the plurality of news programs into a plurality of groups of moving picture news reports reporting same contents; referring to preference information input by a user, and selecting a moving picture news report from each of the plurality of groups generated by the grouping; and reproducing the selected moving picture news reports.

The operation of reproducing may include the operations of extracting a core part from each of the selected moving picture news reports; and reproducing only the extracted core parts of the selected moving picture news reports.

The method may further include the operation of recording one of information about the reproduced moving picture news reports and information about corresponding groups in a predetermined memory, wherein the operation of reproducing may include the operation of referring to the predetermined memory and not reproducing a moving picture news report comprised in a group having a previously reproduced moving picture news report.

The operation of grouping may be performed by referring to at least one of an electronic program guide (EPG) of the plurality of news programs, web bulletins related to the plurality of news programs, and captions of the plurality of news programs.

The operation of selecting may include the operations of collecting metadata of the moving picture news reports; and comparing the metadata of the moving picture news reports with the preference information input by the user, wherein the metadata and the preference information comprise information about at least one of an anchorperson's name, a news program title, a broadcasting station, a broadcasting time, and a news report genre.

The operation of collecting may be performed by referring to at least one of web bulletins, captions, and an EPG, which are related to the moving picture news reports.

When a moving picture news report matching the preference information input by the user is not in the moving picture news reports, the operation of selecting may include the operation of selecting a recently broadcast moving picture news report from among moving picture news reports in a corresponding group.

The core part may be one of an anchor shot part and an episode shot part, which are of the selected moving picture news report.

The operation of extracting the core part may be performed based on a high number of words overlapping with other moving picture news reports comprised in a same group, wherein the words are from among words used in the selected moving picture news report.

According to another aspect of the present invention, there is provided a recording medium having recorded thereon a computer program for executing the method.

According to another aspect of the present invention, there is provided a browsing apparatus for browsing a plurality of news programs, the browsing apparatus including a grouping unit grouping moving picture news reports comprised in the plurality of news programs into a plurality of groups of moving picture news reports reporting same contents; a selecting unit referring to preference information input by a user, and selecting a moving picture news report from each of the plurality of groups generated by the grouping; and a reproducing unit reproducing the selected moving picture news reports.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION OF THE INVENTION

The exemplary embodiments of the present invention will now be described more fully with reference to the accompanying drawings, in which exemplary embodiments of the invention are shown.

Figure 1:
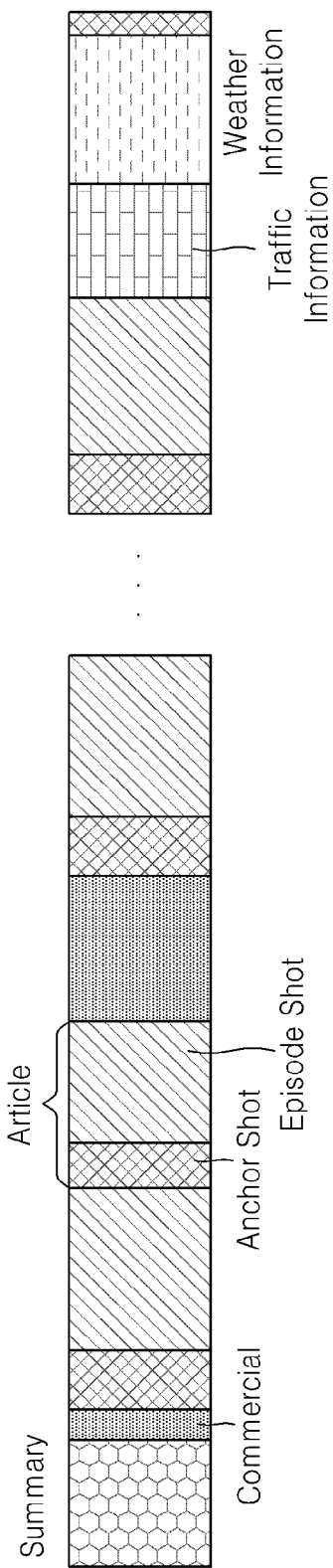
FIG. 1 is a diagram of a structure of a news program moving picture.
Figure 2:
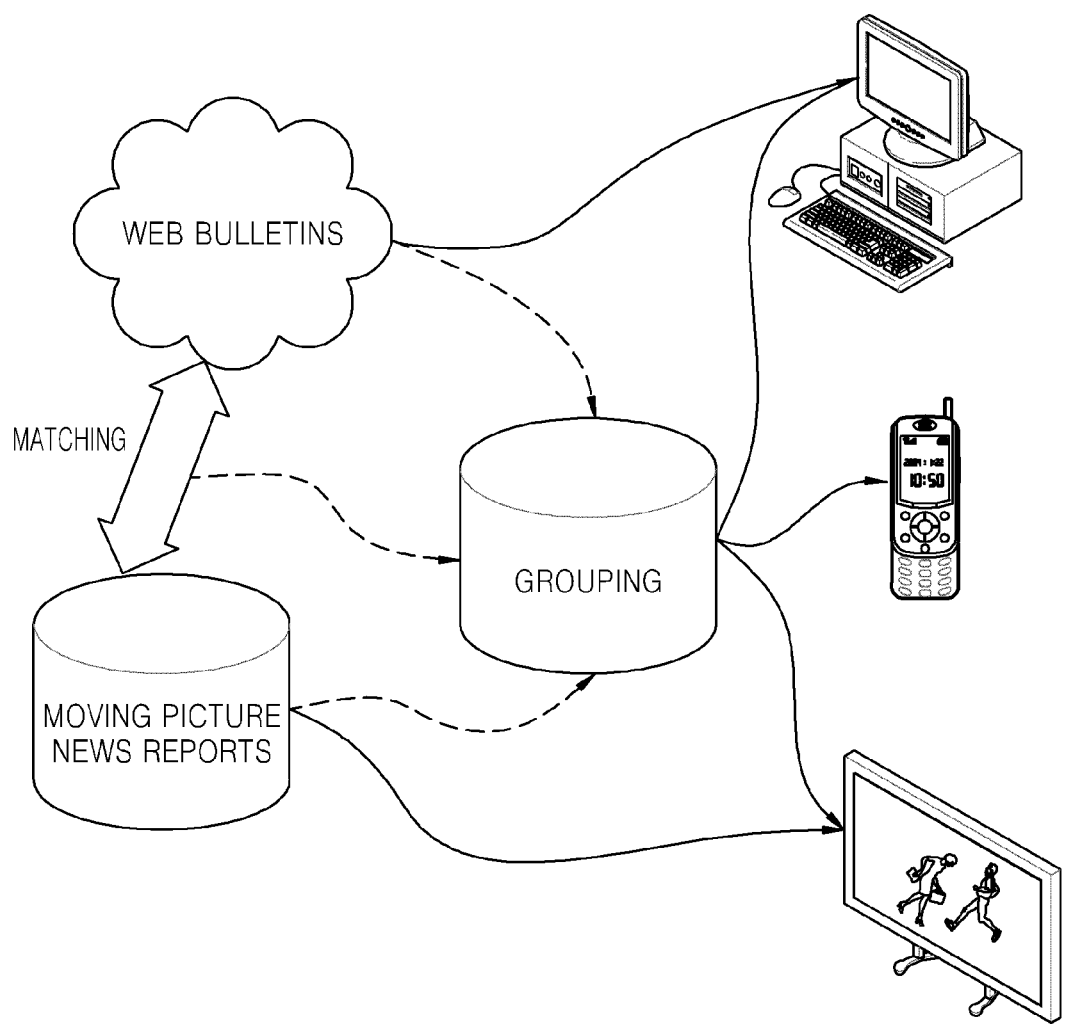
FIG. 2 is a diagram for describing a method of constructing a database of a plurality of moving picture news reports according to an embodiment of the present invention.

FIG. 2 is a diagram for describing a method of constructing a database of a plurality of moving picture articles according to an embodiment of the present invention.

As illustrated in FIG. 2, in the current embodiment of the present invention, the moving picture news reports included in a plurality of news programs broadcast during a predetermined period are grouped according to contents of news reports. That is, moving picture news reports reporting the same or similar contents belong to the same group, regardless of the broadcasting station or broadcast time.

For this grouping, an operation of dividing one news program according to news reports has to be first performed. Such an operation may be performed using one of a plurality of techniques such as an anchorperson distinction via screen analysis, voice analysis, caption analysis, and the like. For reference, a method of distinguishing anchorpersons via the screen analysis has been variously researched, and disclosed in [Unsupervised Video-Shot Segmentation and Model-Free Anchorperson Detection for News Video Story Parsing, IEEE Transactions on Circuits and Systems for Video Technology, vol. 12, no. 9, September 2002].

Otherwise, a news program may be divided according to news report by using a web topic that is a web bulletin generated by a broadcasting station or a news provider who posts a news program according to news report. Since such a web bulletin is generated by a person who manually divides the news reports, the division according to news report is accurate. Thus, a voice or caption of the news program may be compared with a text of the web bulletin so as to divide the news program according to moving picture news report. In general, the text included in the web bulletin is equal to a script read by an anchorperson or a reporter in the news program.

The present invention aims to provide a method of effectively browsing moving picture news reports, when a news program is divided according to news report. Hence, in the present invention, a method of dividing the news program according to news report is not limited to a specific method.

After the news programs are divided according to news report, as described above, moving picture news reports are grouped so that moving picture news reports including the same or similar contents may belong to the same group, regardless of the broadcasting stations or the broadcast time. For this grouping, voices, captions, or web bulletins of the moving picture news reports may be analyzed so that moving picture news reports, which mutually have overlapping words, are classified into the same group.

When the moving picture news reports are completely grouped, one moving picture news report from among each of a plurality of groups is selected and reproduced according to a user's browsing request that includes preference information. An apparatus according to the present invention compares the preference information with metadata of the moving picture news reports, and selects moving picture news reports which match the preference information and which are from among each of the groups. By selecting one moving picture news report from among each of the groups, a user may browse the moving picture news reports broadcast during the predetermined period, without any overlapping or skipping.

Meanwhile, the metadata and the preference information include information about various items such as an anchorperson's name, a news program title, a broadcasting station, a broadcasting time, a news report genre, and the like. Such metadata may be collected via web bulletins, captions, and an electronic program guide (EPG), which are related to the moving picture news reports.

After the selected moving picture news reports are reproduced via a user terminal, the reproduced moving picture news reports or an identifier of a corresponding group is recorded in a predetermined memory. By doing so, when a moving picture news report is reproduced at a later time, the predetermined memory is referred to in order to prevent a previously watched moving picture news report from being reproduced again, so that a user may not repeatedly watch a moving picture news report including the same contents.

Meanwhile, when the selected moving picture news reports are reproduced, only a core part of the selected moving picture news reports may be reproduced according to a user selection. Such a core part may be an anchor shot, or an episode shot. Otherwise, the core part may be determined to be a part that includes words, which are obtained by comparing each of a plurality of words extracted from news reports in a same group and which have a high number of words overlapping, or which are classified according to a predefined importance. In this manner, by reproducing only the core part of the selected moving picture news reports, the user may rapidly and effectively browse the news programs.

Figure 3A:
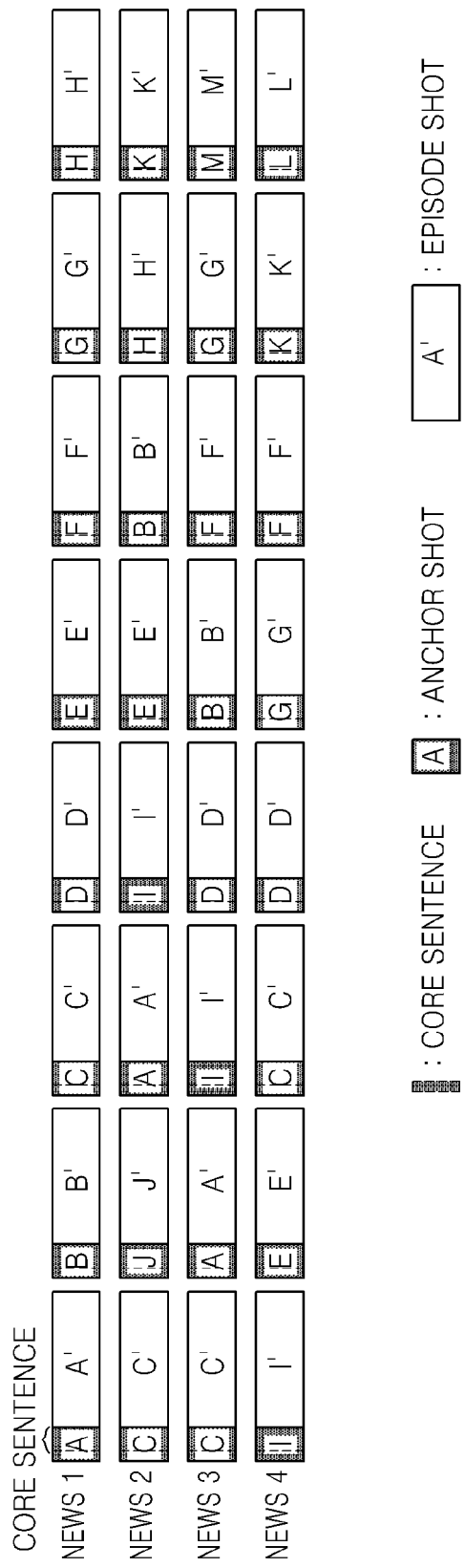
FIGS. 3A and 3B are diagrams for describing a method of browsing news programs according to another embodiment of the present invention.
Figure 3B:
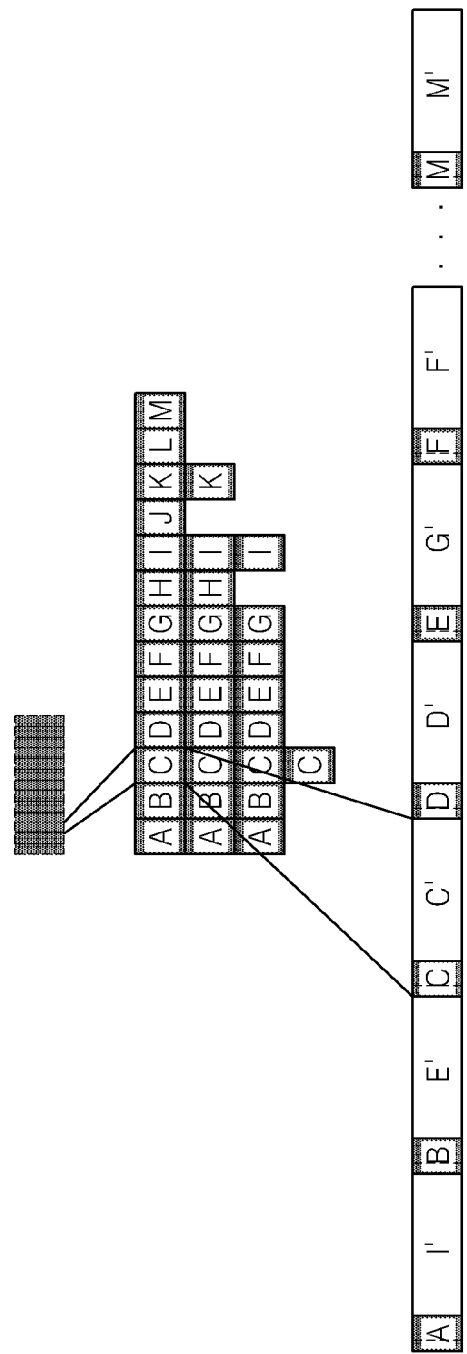

FIGS. 3A and 3B are diagrams for describing a method of browsing news programs according to another embodiment of the present invention.

As illustrated in FIG. 3A, news programs recorded during a predetermined period are a news 1, a news 2, a news 3, and a news 4. Each of the news programs individually includes eight moving picture news reports.

A total of 32 moving picture news reports are divided using letters, such as A, B, C, D, and the like, according to contents of news reports. With respect to a moving picture news report A, for example, an anchor shot and an episode shot are respectively referred to as A, and A'. Hereinafter, a moving picture news report including the anchor shot A and the episode shot A' is referred to as an 'A news report'. In the anchor shot, a part divided using a dotted line is a core sentence part that is to be described later.

As illustrated in FIG. 3A, in the current embodiment, the A news report is included in the news 1, the news 2, and the news 3, and thus, a group related to the A news report includes three moving picture news reports. Meanwhile, three moving picture news reports are included in a group related to a B news report, and four moving picture news reports are included in a group related to a C news report. In this manner, moving picture news reports of other groups are also determined.

In the group related to the C news report (hereinafter, referred to as a C group), a browsing apparatus according to the present invention refers to preference information of a user and selects one of the four moving picture news reports included in the C group. For example, when the user specifies a user desired broadcasting station, a user desired anchorperson, and a user desired news report genre, and inputs a news browsing command, the browsing apparatus according to the present invention selects a moving picture news report which most matches such preference information and which is from among the four moving picture news reports included in the C group. For this selecting, the preference information has to be compared with metadata of the four moving picture news reports included in the C group. Such metadata may be collected via web bulletins, captions, and an EPG, which are related to the moving picture news reports of the C group. It is desirable to enable the user to set different priorities for items forming the preference information so that one moving picture news report that most closely matches the preference information may be determined in any circumstances.

Meanwhile, in the moving picture news reports of the C group, there may be no moving picture news report that matches the preference information input by the user. For example, the user intends to watch moving picture news reports reported by an anchorwoman but all of the four moving picture news reports included in the C group are reported by an anchorman. In this case, a recently broadcast moving picture from among the four moving picture news reports included in the C group may be selected.

When one moving picture news report is selected from among each of a plurality of groups, the selected moving picture news reports may be reproduced using various techniques. A user may reproduce only core parts of the selected moving picture news reports. Such core parts may be an anchor shot, an episode shot, or a core sentence part.

Here, the core sentence part is a part of the anchor shot, and is a part excluding a greeting message from an anchorperson, or excluding a part that is not related to article contents. Such a core sentence part may be extracted by analyzing words included in a moving picture news report. For example, words extracted from anchor shots of the four moving picture news reports included in the C group are analyzed, frequently overlapped words from among the extracted words are classified into core words, and the core sentence part is determined to be at least one sentence that most includes such core words. At this time, the words extraction from the anchor shots may be performed via caption analysis or voice analysis.

FIG. 3B is a diagram for illustrating various techniques by which moving picture news reports selected from each of a plurality of groups are reproduced. That is, as illustrated in an upper part of FIG. 3B, only a core sentence part of the selected moving picture news reports may be reproduced. Otherwise, as illustrated in a middle part of FIG. 3B, only an anchor shot may be reproduced. Otherwise, as illustrated in a lower part of FIG. 3B, a whole moving picture news report may be reproduced. Only an episode shot may be reproduced, even though this case is not illustrated in FIG. 3B. Such various reproduction modes may be switched in turn according to a user input.

Figure 4:
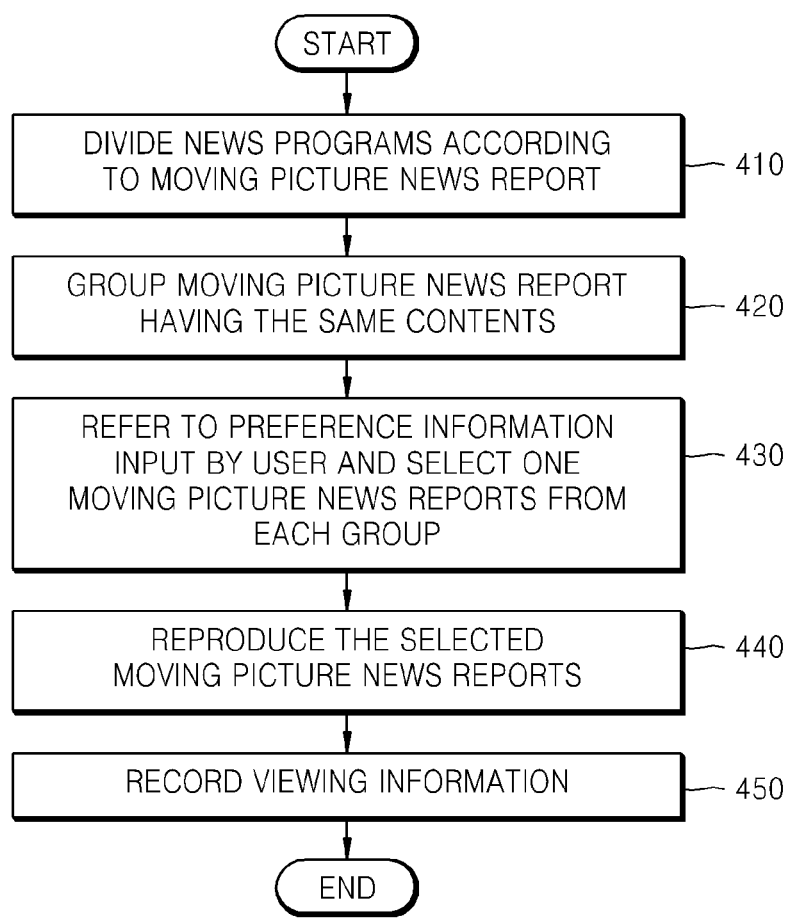
FIG. 4 is a flowchart of a procedure for browsing news programs according to another embodiment of the present invention.

FIG. 4 is a flowchart of a procedure for browsing news programs according to another embodiment of the present invention.

In operation 410, a plurality of news programs broadcast during a predetermined period are divided according to news report. As described above with reference to FIG. 2, web bulletins may be referred to for the division of the news programs according to news report.

In operation 420, a plurality of moving picture news reports included in the news programs are grouped on the basis of moving picture news reports having the same contents.

In operation 430, preference information input by a user is referred to, and one moving picture news report is selected from each of a plurality of groups. For this, metadata of moving picture news reports included in each of the groups is compared with the preference information. The metadata is collected via web bulletins, captions, and an EPG, which are related to the moving picture news reports. As described above with reference to FIG. 2, such preference information and the metadata include information about a news program title, a broadcasting station, a broadcasting time, a news report genre, and the like.

In operation 440, the selected moving picture news reports are reproduced. As described above, only a core sentence part of the selected moving picture news reports may be reproduced, or only an anchor shot may be reproduced, according to a user input. Meanwhile, a browsing apparatus according to the present invention refers to a predetermined memory so as not to reproduce a moving picture news report which is determined to have been previously watched by a user. That is, the browsing apparatus does not reproduce a moving picture news report that belongs to the same group with the previously watched moving picture news report. In other words, viewing information of the user is recorded to such a predetermined memory, and an identifier of a moving picture news report previously reproduced according to a user request, or an identifier of a group including the moving picture news report may be used as the viewing information.

In operation 450, identifiers of the moving picture news reports reproduced in operation 440, or identifiers of groups including the moving picture news reports are recorded to the predetermined memory to which the viewing information is recorded.

Figure 5:
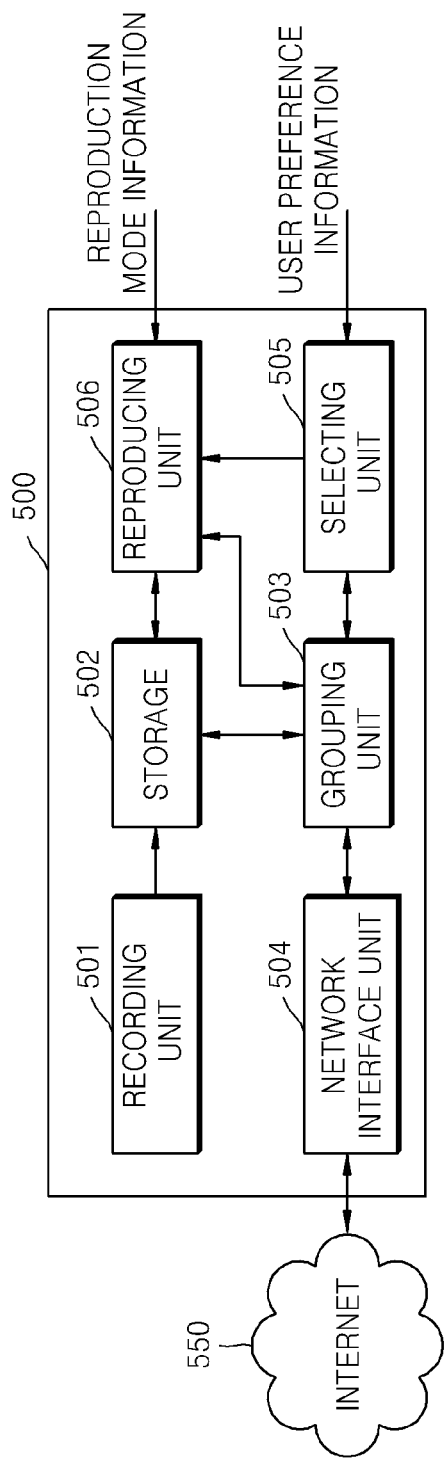
FIG. 5 is a diagram of a structure of a browsing apparatus for browsing news programs, according to an embodiment of the present invention.

FIG. 5 is a diagram of a structure of a browsing apparatus 500 for browsing news programs, according to an embodiment of the present invention. The browsing apparatus 500 may be installed in a set-top box, a digital television (TV), a Video on Demand (VOD) server, and the like.

As illustrated in FIG. 5, the browsing apparatus 500 according to the current embodiment of the present invention includes a recording unit 501, a storage unit 502, a grouping unit 503, a network interface unit 504, a selecting unit 505, and a reproducing unit 506.

The recording unit 501 records news programs broadcast via a digital broadcasting channel during a predetermined period so as to store the news programs in the storage unit 502. Such a predetermined period may be set by a user.

The grouping unit 503 divides the news programs, which are recorded during the predetermined period and stored in the storage 502, according to news report, and groups moving picture news reports included in the news programs according to contents. That is, after such a grouping operation is performed, moving picture news reports reporting the same or similar contents are grouped into a same group. For the grouping operation, various information such as an EPG, web bulletins, captions, and the like, which are of the news programs, are referred to. Some of the various items of information may be obtained from the Internet 550. The network interface unit 504 provides access to the Internet 550.

The selecting unit 505 collects metadata about the grouped moving picture news reports, and compares the collected metadata with preference information input by a user, thereby selecting a moving picture news report which matches the preference information input by the user and which is from among the grouped moving picture news reports.

That is, a moving picture news report that most closely matches the preference information input by the user is selected from each of the groups, and in this regard, a recently broadcast moving picture news report may be selected from a group that does not have the moving picture news report matching the preference information.

The metadata and the preference information may include a plurality of pieces of information such as an anchor name, a news program title, a broadcasting station, a broadcasting time, a news report genre, and the like. The metadata of the moving picture news report may be collected via a web bulletin, a caption, an EPG, and the like, which are related to the moving picture news report.

The reproducing unit 506 reproduces the moving picture news report selected by the selecting unit 505. However, the reproducing unit 506 refers to a predetermined memory (not shown) in which viewing information of the user is recorded, and does not reproduce a moving picture news report that has been previously watched by the user.

Meanwhile, the reproducing unit 506 may reproduce the moving picture news report selected by the selecting unit 505, by using various techniques according to reproduction mode information input by the user. That is, the reproducing unit 506 may reproduce the whole moving picture news report, or may extract a core part and reproduce only the core part.

Also, the core part may be an anchor shot, an episode shot, or a core sentence part. Here, for the core sentence part, words used in moving picture news reports included in a same group are mutually compared with each other, and words having high frequency of overlap are extracted from among the compared words. After that, the core sentence part may be determined to be a part that corresponds to at least one sentence which includes the extracted words and which is from an anchor shot of the moving picture news report of the same group selected by the selecting unit 505.

Various reproduction modes according to the various techniques may be mutually switched in turn according to the reproduction mode information input by the user. Examples of screens according to each of the reproduction modes are illustrated in FIGS. 6A through 6C.

Figure 6A:
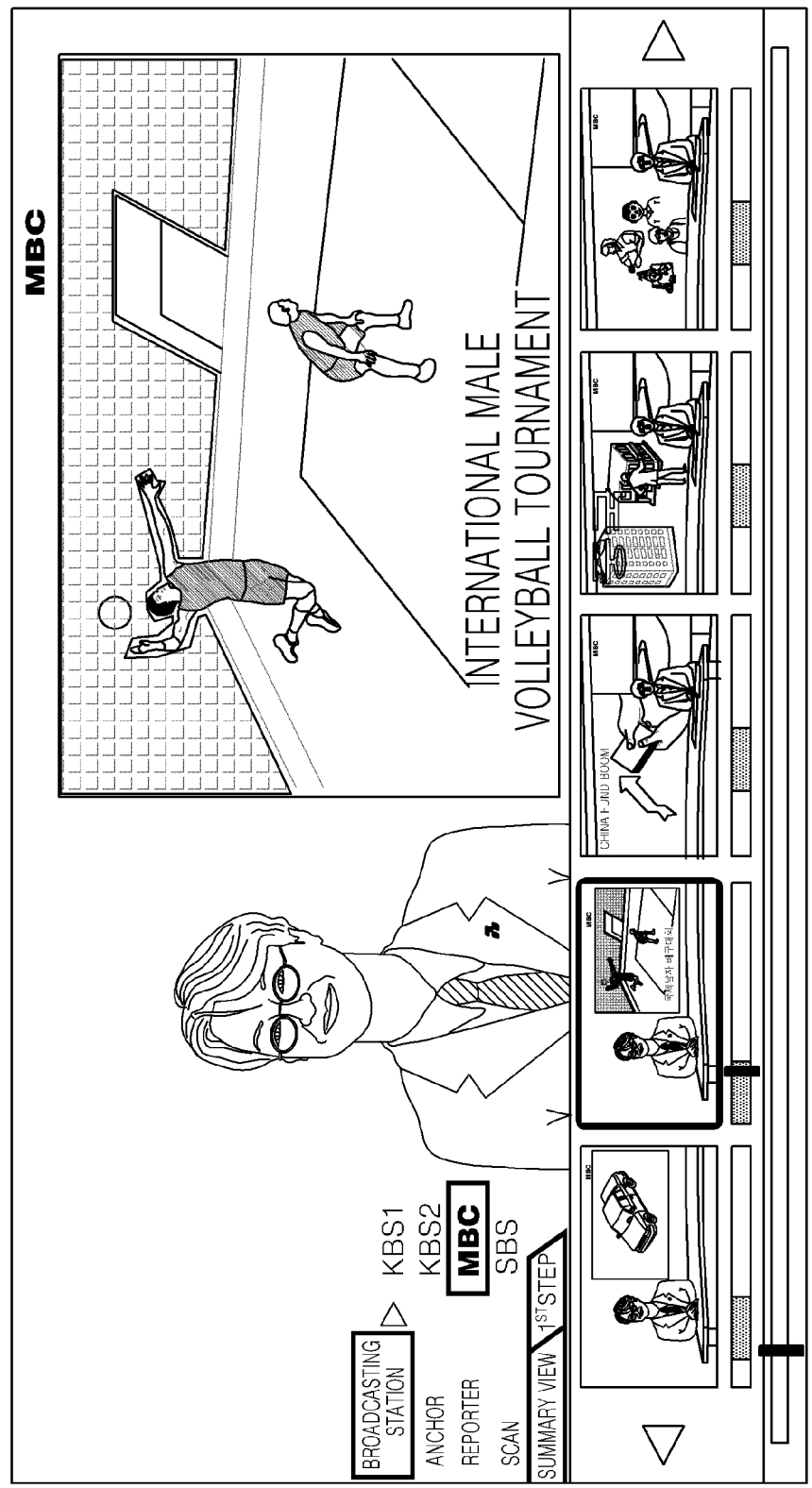
FIGS. 6A through 6C are diagrams of news programs displayed on a screen, according to another embodiment of the present invention.

FIG. 6A illustrates a case in which only a core sentence part of moving picture news reports selected from each of a plurality of groups is reproduced.

Referring to FIG. 6A, it is possible to understand that a user has selected an MBC broadcasting station as preference information about a broadcasting station (preference information about an anchor and a reporter is not illustrated in FIG. 6A). In a bottom part of FIG. 6A, thumbnails indicating the moving picture news reports selected from each of the groups are illustrated. A scroll bar illustrated in a bottom part of each of the thumbnails indicates an anchor shot, and a dark part of the scroll bar indicates a core sentence part. Referring to FIG. 6A, it is possible to understand that a core sentence part of a second moving picture news report is being reproduced from among 5 moving picture news reports illustrated in the bottom part of a current screen.

Figure 6B:
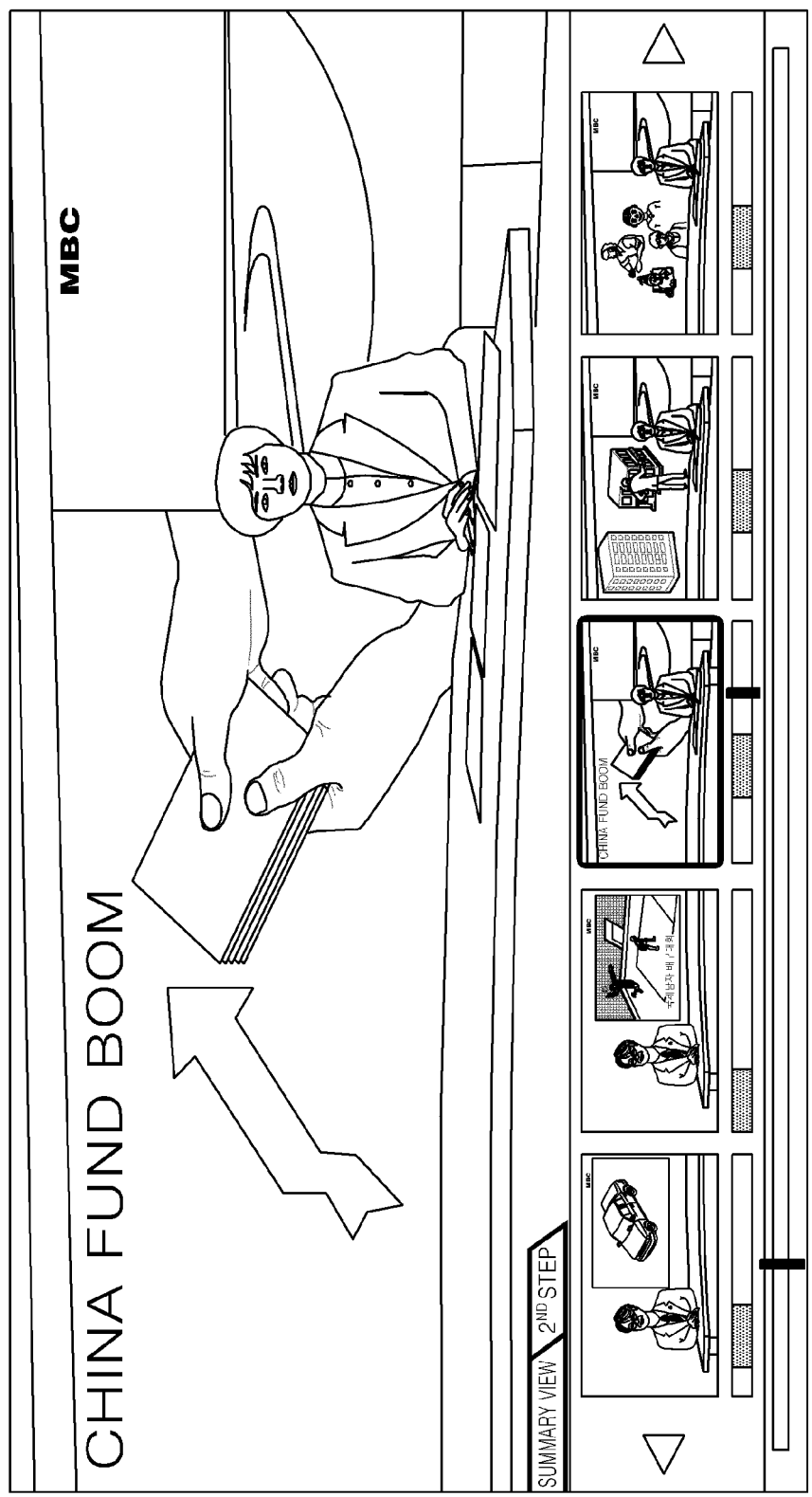
Figure 6C:
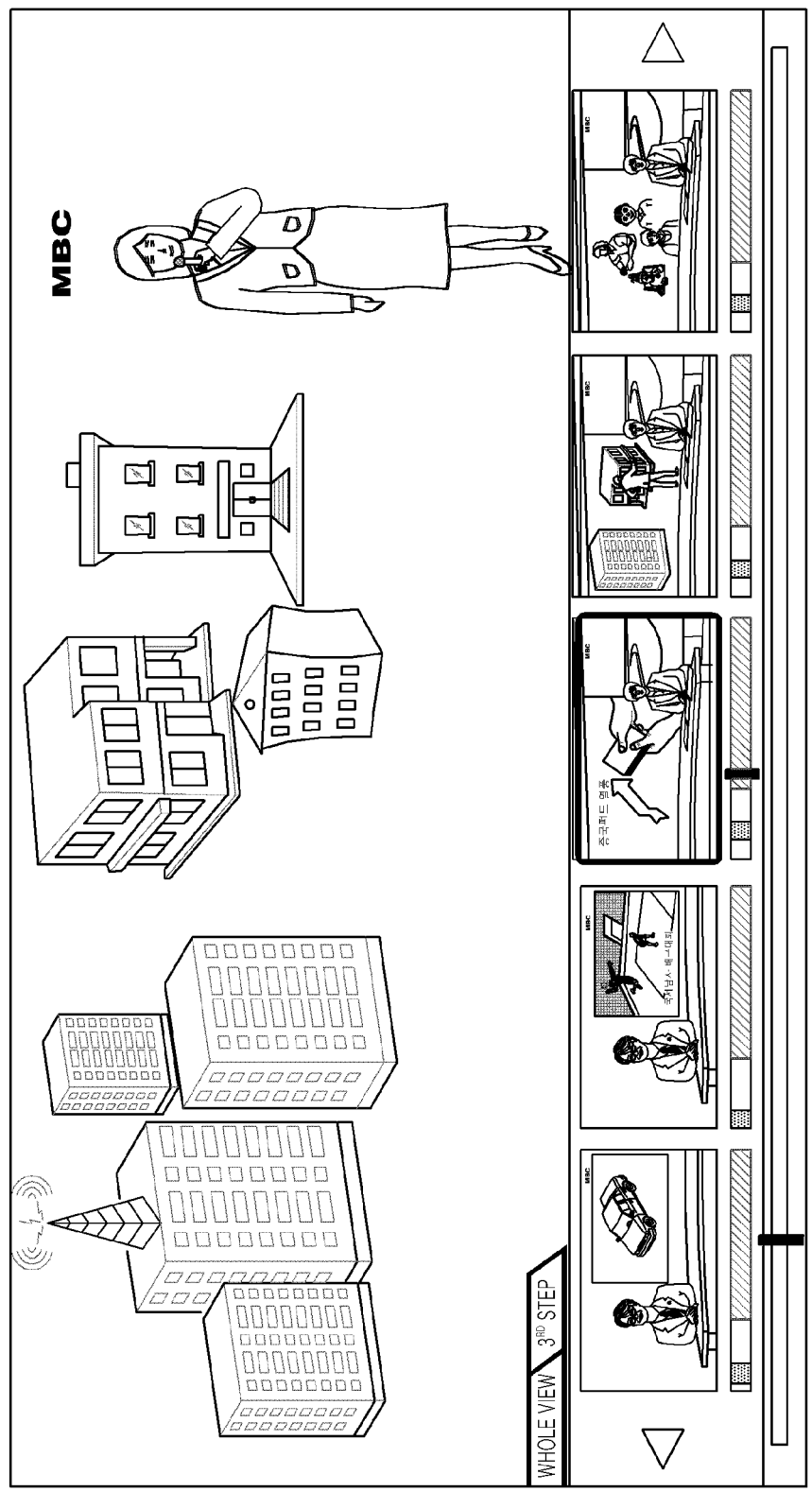

FIG. 6B illustrates a case in which only an anchor shot of moving picture news reports selected from each of a plurality of groups is reproduced. In FIG. 6B, like in the case of FIG. 6A, a scroll bar illustrated in a bottom part of each of thumbnails indicates an anchor shot, and a dark part of the scroll bar indicates a core sentence part. Referring to FIG. 6B, it is possible to understand that an anchor shot part of a moving picture news report corresponding to a third thumbnail from among 5 thumbnails is being reproduced.

FIG. 6C illustrates a case in which all moving picture news reports selected from each of a plurality of groups are reproduced.

A scroll bar illustrated in a bottom part of each of thumbnails is divided into an anchor shot part and an episode shot part, and a dark part of the anchor shot part indicates a core sentence part. Referring to FIG. 6C, it is possible to understand that an episode shot part of a moving picture news report corresponding to a third thumbnail from among 5 thumbnails is being reproduced.

According to the present invention, a moving picture news report from among moving picture news reports which report the same or similar contents and which are from among a plurality of moving picture news reports included in a plurality of news programs, is selected and reproduced since the moving picture news report matches a user preference. Furthermore, only a user desired part of the moving picture news report is reproduced so that a browsing operation related to the news programs can be effectively and rapidly performed.

The embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), and optical recording media (e.g., CD-ROMs, or DVDs). In other exemplary embodiments, the computer readable recording medium may include storage media such as carrier waves (e.g., transmission through the Internet).

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of browsing a plurality of separate news programs, the method comprising:

grouping a first moving picture news report dealing with a first topic and a third moving picture news report dealing with the first topic into a first group of moving picture news reports, and grouping a second moving picture news report dealing with a second topic and a fourth moving picture news report dealing with the second topic into a second group of moving picture news reports, wherein the first moving picture news report and the second moving picture news report belong to a first news program, and the third moving picture news report and the fourth moving picture news report belong to a second news program which is separate from the first news program;

selecting, based on preference information input by a user, the first moving picture news report from the first group and the second moving picture news report from the second group, if there are matches; and reproducing the first and the second moving picture news reports, wherein the plurality of separate news programs do not belong to a single program.

2. The method of claim 1, wherein the reproducing comprises:

extracting core parts from the first and the second moving picture news reports; and reproducing only the extracted core parts of the first and the second moving picture news reports.

3. The method of claim 1, further comprising recording one of information about the reproduced first and second moving picture news reports and information about corresponding first and second groups in a predetermined memory, wherein the reproducing comprises referring to the predetermined memory, and not reproducing a moving picture news report in a group having a previously reproduced moving picture news report.

4. The method of claim 1, wherein the grouping is performed by referring to at least one of an Electronic Program Guide (EPG) of the plurality of separate news programs, web bulletins related to the plurality of separate news programs, and captions of the plurality of separate news programs.

5. The method of claim 1, wherein the selecting comprises:

collecting metadata of the moving picture news reports in the first and the second groups; and comparing the metadata with the preference information input by the user, wherein the metadata and the preference information include information about at least one of an anchorperson's name, a news program title, a broadcasting station, a broadcasting time, and a news report genre.

6. The method of claim 5, wherein the collecting is performed by referring to at least one of web bulletins, captions, and an Electronic Program Guide (EPG), which are related to the moving picture news reports.

7. The method of claim 1, wherein, if a moving picture news report matching the preference information input by the user is not in one of the first and the second groups, the selecting comprises selecting a recently broadcast moving picture news report from among moving picture news reports in corresponding one of the first and the second groups.

8. The method of claim 2, wherein one of the core parts include one of an anchor shot part and an episode shot part, which are of one of the first and the second moving picture news reports.

9. The method of claim 2, wherein extracting of a first core part of the core parts is performed based on a number of words of the first moving picture news report, overlapping with words of other moving picture news reports in the first group, wherein the words of the first moving picture news report are from among words used in the first moving picture news report.

10. A recording medium having recorded thereon a computer program for executing the method of claim 1.

11. A browsing apparatus for browsing a plurality of separate news programs, the browsing apparatus comprising:

a grouping unit which groups a first moving picture news report dealing with a first topic and a third moving picture news report dealing with the first topic into a first group of moving picture news reports, and groups a second moving picture news report dealing with a second topic and a fourth moving picture news report dealing with the second topic into a second group of moving picture news reports, wherein the first moving picture news report and the second moving picture news report belong to a first news program. and the third moving picture news report and the fourth moving picture news report belong to a second news program which is separate from the first news program;

a selecting unit which refers to preference information input by a user, and selects, based on the preference information, the first moving picture news report from the first group and the second moving picture news report from the second group, if there are matches; and a reproducing unit which reproduces the first and the second moving picture news reports, wherein the plurality of separate news programs do not belong to a single program.

12. The browsing apparatus of claim 11, wherein the reproducing unit extracts core parts from the first and the second moving picture news reports, and reproduces only the extracted core parts of the first and the second moving picture news reports.

13. The browsing apparatus of claim 11, wherein the reproducing unit records one of information about the reproduced first and second moving picture news reports and information about corresponding first and second groups in a predetermined memory, refers to the predetermined memory to reproduce the first and the second moving picture news report, and does not reproduce a moving picture news report in a group having a previously reproduced moving picture news report.

14. The browsing apparatus of claim 11, wherein the grouping unit groups the moving picture news reports by referring to at least one of an Electronic Program Guide (EPG) of the plurality of separate news programs, web bulletins related to the plurality of separate news programs, and captions of the plurality of separate news programs.

15. The browsing apparatus of claim 11, wherein the selecting unit collects metadata of the moving picture news reports in the first and the second groups, compares the metadata with the preference information input by the user in a comparison, and selects, based on the comparison, the first and the second moving picture news reports which match the preference information input by the user, wherein the metadata and the preference information include information about at least one of an anchorperson's name, a news program title, a broadcasting station, a broadcasting time, and a news report genre.

16. The browsing apparatus of claim 15, wherein the selecting unit collects the metadata by referring to at least one of web bulletins, captions, and an Electronic Program Guide (EPG), which are related to the moving picture news reports.

17. The browsing apparatus of claim 11, wherein, when a moving picture news reports matching the preference information input by the user is not in one of the first and the second groups, the selecting unit selects a recently broadcast moving picture news report from among moving picture news reports in the corresponding one of the first and the second groups.

18. The browsing apparatus of claim 12, wherein one of the core parts includes one of an anchor shot part and an episode shot part, which are of one of the first and the second moving picture news reports.

19. The browsing apparatus of claim 12, wherein the reproducing unit extracts the core parts, based on a number of words of the first moving picture news report, overlapping with words other moving picture news reports in the first group, wherein the words of the first moving picture news report are from among words used in the first moving picture news report.

* * * * *